United States Patent [19]
Martone et al.

[11] 3,814,938
[45] June 4, 1974

[54] SCINTILLATION CAMERA WITH IMPROVED LIGHT DIFFUSION

[75] Inventors: Ronald J. Martone, Cheshire; Samuel C. Goldman, Bethany; Walter Wolczek, Trumbull, all of Conn.

[73] Assignee: Picker Corporation, Cleveland, Ohio

[22] Filed: July 10, 1972

[21] Appl. No.: 270,006

[52] U.S. Cl. ................. 250/366, 250/368, 250/369, 250/505
[51] Int. Cl. ............................................ G01t 1/20
[58] Field of Search ........... 250/361, 362, 367, 368, 250/369, 505, 511

[56] References Cited
UNITED STATES PATENTS

3,048,698 8/1962 Carlson ..................... 250/367 X
3,068,359 12/1962 Carlson ............................. 250/366
3,209,201 9/1965 Anger ........................... 250/367 X
3,683,180 8/1972 Martone et al. .................... 250/366

Primary Examiner—Archie R. Borchelt
Attorney, Agent, or Firm—Watts, Hoffmann, Fisher & Heinke

[57] ABSTRACT

A scintillation camera of the multiple phototube type. A thin light pipe and masks are employed to diffuse the light so that the camera operates on a principle of light diffusion rather than phototube "viewing" as described in the prior art. The configurations of the masks are selected in accordance with the characteristics of the crystal and associated phototubes.

31 Claims, 7 Drawing Figures

SCINTILLATION CAMERA WITH IMPROVED LIGHT DIFFUSION

CROSS REFERENCES TO RELATED PATENTS AND APPLICATIONS

1. U.S. Pat. No. Re26,014 issued May 3, 1966 to J. B. Stickney et al., a reissue of U.S. Pat. No. 3,070,695, dated Dec. 25, 1962, entitled "Scintillation Scanner."

2. Application for U.S. Pat. Ser. No. 198,520, filed Nov. 15, 1971, now abandoned by Robert Hindel, Ronald J. Martone and Peter G. Mueller, entitled "Scintillation Camera" which is a continuation of Ser. No. 837,072 filed June 27, 1969 by Ronald J. Martone, Peter G. Mueller and Robert Hindel, under the same title, now abandoned, (here the HINDEL application).

3. Application for U.S. Pat. Ser. No. 833,552, filed June 16, 1969, now U.S. Pat. No. 3,683,180, by Ronald J. Martone, Peter G. Mueller and Richard J. Flis, entitled "Scintillation Camera," (here the MARTONE-MUELLER application).

4. Application for U.S. Pat. Ser. No. 121,445, filed Mar. 5, 1971 by Ronald J. Martone, Samuel C. Goldman and Clifford C. Heaton, entitled "Scintillation Camera with Light Diffusion System," (here the MARTONE-GOLDMAN application).

BACKGROUND OF THE INVENTION

1. Field of the Invention

This invention pertains to gamma imaging devices and more particularly to that class of devices known as scintillation cameras.

In the diagnosis of certain illnesses, radioactive agents are administered to patients. These administered agents have the characteristic of localizing in certain tissues and either not localizing, or localizing to a lesser degree, in other tissues. For example, iodine 131 will localize in thyroid glands. A representation of the spatial distribution and concentration of administered iodine 131 in a thyroid gland provides an image of the gland itself which is useful in diagnosing the condition of the gland.

2. Description of the Prior Art

Generally speaking, two classes of devices known as scanners and cameras have been used to detect and represent the spatial distribution and localization of radioactive isotopes. Typically, a scanner has a scintillation probe which is moved along a plurality of spaced parallel paths. Gamma energy detected by the probe results in a display through either a photographic or a dot image representative of the spatial distribution and localization of an isotope. A clinically successful scanner is described in greater detail in the referenced patent.

The devices known as cameras remain stationary with respect to the patient as a representation of the spatial distribution of radioactivity is developed. With many of these cameras, a relatively large disc-shaped scintillation crystal is positioned to be stimulated by radiation emitted from the patient. In most cameras, a collimator is interposed between the patient and the crystal so that, for example, with a parallel hole collimator the rays striking the crystal are all generally perpendicular to it.

The crystal scintillates as it converts gamma energy impinging on it to light energy. The light is conducted through a suitable light pipe, to an array of phototubes. When a phototube is stimulated by light generated in a crystal by a scintillation, an electrical signal is emitted which is proportional to the intensity of light energy received by that tube. When a scintillation causes all or substantially all of the phototubes to emit signals, these signals are emitted concurrently and are then summed to provide a signal known as the Z signal. This Z signal is conducted to a pulse-height analyzer to determine whether the signal reflects the occurrence of a so-called photopeak event of the isotope which has been administered to the patient. That is, the Z-signal is of appropriate strength to reflect the full conversion of the energy of a gamma ray emitted from the administered isotope to light energy by the crystal.

Summing and ratio circuits are also provided which develop what are known as X and Y signals. These X and Y signals cause a dot to be produced on the screen of the oscilloscope at a location corresponding to the location of the detected scintillation. Thus, the oscilloscope dots are displaced relatively, each at a location corresponding to the location of the corresponding scintillation in the crystal and the oscilloscope dots are integrated to produce an image. Suitable circuits for producing an oscilloscope image of spatial distribution of a radioactive isotope are described in greater detail in the HINDEL application.

The phototubes, the circuits and the oscilloscope function as a unit to provide a light amplifier such that each dot produced on the oscilloscope is a brightened representation of a scintillation. Through the use of a persistence screen on the scope, or a photographic camera, these dots are integrated to produce an image.

With cameras of the type using an array of phototubes, the literature has described a spacing of the phototubes a sufficient distance from the crystal so that the tubes "view coextensive areas." Typically, there will be a spacing of the order of two inches between a crystal and a phototube. More specifically, since the typical crystal is thallium activated sodium iodide, it is hygroscopic and must be hermetically enclosed. At the output side of the crystal, the typical hermetic enclosure includes a glass window which has a thickness of about one-half inch. A light pipe, such as the light pipe described in greater detail in the MARTONE-MUELLER application, is optically coupled to both the window and the phototubes. Typically, the light pipe will have a thickness of the order of 1½ inches.

Thus, in a camera of these typical dimensions, any scintillation occurring in the crystal must, as a minimum, be at least 2 inches from the nearest phototube. Proposals for somewhat thinner light pipes are known, but the thinnest of these, prior to the disclosure of the MARTONE-GOLDMAN application, has been 1⅜ inches, which, if coupled with a one-half inch glass, results in a minimum scintillation-to-phototube distance of 1⅞ inches.

It may generally be said that the further a scintillation is from the phototube, the weaker will be the light signal received by the phototube and accordingly, the weaker the electrical output of the phototube. Accordingly, the closer the phototubes are to the scintillation, the stronger will be the signals. Both theory and experiment indicate that this will better the spatial resolving power of the instrument.

As noted above, it has been taught that the tubes must be sufficiently spaced to view overlapping, coextensive areas in the scintillator. In addition, with known light pipe constructions, if the spacing between the crystal and the phototubes is too small, there is a loss of uniformity and linearity. That is, the response of the system to a uniform source of activity will exhibit bright and dark areas not related to the isotope concentration and furthermore, light signals produced on the oscilloscope will be displaced from the desired position and result in a distorted image. Additionally, it is known there will be a loss of uniformity of system sensitivity. That is, the pictures formed by integrating light dots will exhibit light or dark areas not related to isotope concentration, this indicating a preferential ability to utilize scintillations for a given pulse height analyzer window in certain parts of the crystal.

The MARTONE-GOLDMAN application disclosed that a camera constructed to operate on a principle totally different from the principle summarized above and described in greater detail in the literature will have spatial resolving power far in excess of that theoretically obtainable in the past and far in excess of that which has heretofore been obtained in practice.

According to the MARTONE-GOLDMAN disclosure, a relatively thin light conductor is used, i.e., a light conductor of the order of one-half inch or less in thickness. Masks are interposed at selected locations between the phototubes and the scintillator. The masks reflect and diffuse the light so that a generalized flow is achieved throughout the light conductor. When a mask is between the scintillator and one or more phototubes, it prevents the direct conduction of a portion of light from the point where a scintillation occurs to those phototubes.

The phototubes emit electrical signals with the strength of each signal being proportional to the intensity of diffused and direct light conducted by the light conductor to each phototube. Electronic circuitry of the type described in the HINDEL application is then utilized to determine the locus of the scintillation and cause a dot to be produced on a read-out device at a location corresponding to the point at which a photopeak event occurred in the crystal.

In a 19-phototube scintillation camera, it is now conventional to have one center tube surrounded by an inner ring of six tubes which inner ring is, in turn, surrounded by an outer ring of 12 tubes. The tubes are so located that the axis of each tube is disposed in a plane which is perpendicular to the crystal and which includes the axis of the center tube and at least one other tube.

Outstanding results are achieved by using a mask which takes advantage of the positioning of the phototubes. Specifically, according to the MARTONE-GOLDMAN application, referring to the center tube, a mask is provided on the surface of the light conductor adjacent the crystal window. This mask is of spoke-like configuration with a central hub-like portion and thin strips extending radially from the hub-like portions. Each strip is symmetrical about a plane located by the axes of a plurality of the phototubes.

The described mask, then, diminishes the quantity of light which is conducted directly to the central phototube and also to other phototubes. At the same time, the proportion of diffused or reflected light reaching these other tubes will generally increase.

In the preferred form of the MARTONE-GOLDMAN invention, seven of these hub-like patterns are provided, each being axially aligned with a different phototube. The seven hub-like masks are interposed between the crystal and the central phototube and the phototubes of the inner ring. The masks may take many forms and are most simply and preferably formed of a light-reflective tape or paint.

Small strip-like shields are provided with respect to selected ones of the phototubes in the outer ring while other of the phototubes in the outer ring are not shielded at all in the preferred embodiment. These shields are located between the phototubes and the scintillator and their purpose is to extend the useful field of view of the device.

SUMMARY OF THE INVENTION

It has now been found that still further improvements in camera performance can be achieved if components of the entire decoding system are matched according to their performance. To achieve this improved performance, and to achieve consistent performance in cameras produced, the crystal and the phototubes are tested and matched according to their characteristics. A light conductor is then used which has mask configurations tailored to the characteristics of the tubes and crystal to be used in a given camera.

In practicing the present invention, the quantum efficiency of each phototube is measured. The phototubes are then matched into groups of, for example, relatively low, medium, and relatively high quantum efficiency characteristics. That is, a tube of relatively low quantum efficiency will emit a relatively low electric signal for a given quantum of light as contrasted with a higher electrical signal for the same quantum of light when sensed by a tube having high quantum efficiency and the same gain. Similarly, crystals are graded according to their response to gamma energy. The crystals are graded, for example, according to low, medium and high light output for a given quantum of gamma energy from a calibrated source.

To achieve relatively uniform resolution characteristics in production cameras, a low light output crystal is matched with an array of high quantum efficiency phototubes and a high light output crystal is matched with low quantum efficiency phototubes, while a medium crystal and medium phototubes are matched in a given camera.

This procedure, coupled with the improved light conductor masks of this invention, produces cameras of similar spatial resolution which can be greater than that produced by the camera of the MARTONE-GOLDMAN application. While the described procedure produces cameras of relatively similar resolution characteristics, linearity as well as uniformity of the Z decoding may vary from camera to camera. Accordingly, each camera gamma detector is tested for linearity and decoding characteristics.

In a typical test for linearity, a lead grid arrangement is positioned between a gamma source and the detector. If the linearity of the system is found to be poor, the produced image of the lead grid will be distorted. To correct for poor linearity, a light conductor with masks of relatively large peripheral areas are employed for the inner ring of phototubes.

To check the uniformity of Z decoding, the pulse height analyzer of the camera is first set to accept a relatively low decoded energy and a test is run with a given phantom of radioactive material and an image is produced. The pulse height analyzer is then set for relatively high decoded energy and the test is repeated with the same phantom. If the images produced by the two tests show good uniformity, then there is uniformity in the Z decoding. If, however, the tests both show non-uniformity, the detector is regionally more sensitive to low or to high decoded energy gamma rays and is said to lack Z decoding uniformity. This lack of uniformity is also compensated for by a selection of an appropriate mask configuration. In this instance, the area of the mask toward the center of the phototubes is relatively larger than the preceding case.

The reasons for the variation in linearity and uniformity of decoding are not fully understood. Happily, where linearity is corrected, the uniformity in decoding is at most only very slightly affected and vice versa so that mask corrections for one or the other can be made without unduly adversely affecting the other. The reason is that linearity is corrected by adjusting mask density toward the periphery of the masks while non-uniformity in Z response is corrected by adjusting mask density toward the center of each of the masks.

While the reasons for these variations are not fully understood, it is believed that one major contributing factor is in the light emitting and conducting characteristics of the crystal itself. Expressed another way, when a photopeak event occurs in the crystal, that is a substantial conversion of the gamma energy to light energy, the light diffusion characteristics of the crystal assembly appear to play a major role in the performance characteristics of the camera and the light diffusion characteristics vary appreciably from one crystal assembly to another.

The importance of the improvement in linearity and uniformity of energy decoding cannot be overestimated. While the importance of spatial resolution has been highly stressed in the literature and the spatial resolution can be improved here, many believe that from a clinical standpoint, linearity and uniformity of Z decoding are more important. This is because errors in linearity and errors of Z decoding can result in misinformation as to whether, for example, a tumor exists in a patient. Thus, determining whether there is a tumor present, a function of linearity and uniformity of decoding, is believed more important than determining the precise size of the tumor, a function of spatial resolution.

Accordingly, the object of the invention is to enable the quantity production of gamma cameras of uniform characteristics and a method of producing gamma cameras of excellent image uniformity.

Other objects and a fuller understanding of the invention may be had by referring to the following description and claims taken in conjunction with the accompanying drawings.

BRIEF DESCRIPTION OF THE DRAWINGS

Figure 4:
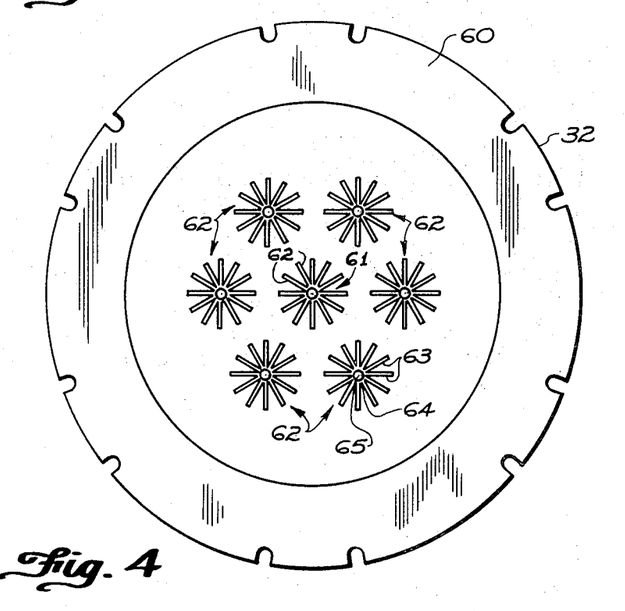
FIG. 4 is a plan view of the light conductor of the MARTONE-GOLDMAN disclosure as seen from the scintillation crystal side of the light conductor; and, FIGS. 5–7 are plan views of typical light conductors of this invention as seen from the scintillation crystal side.
Figure 5:
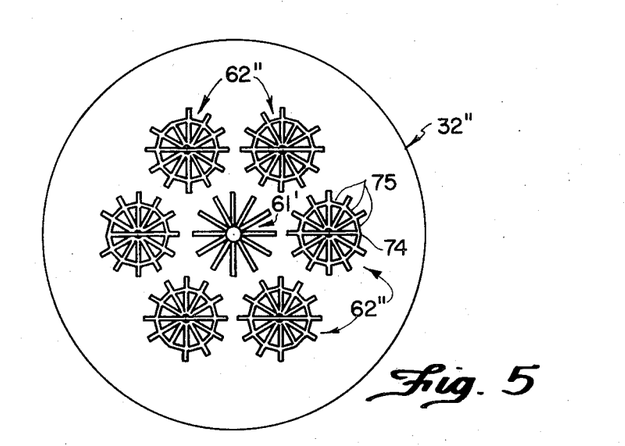
Figure 6:
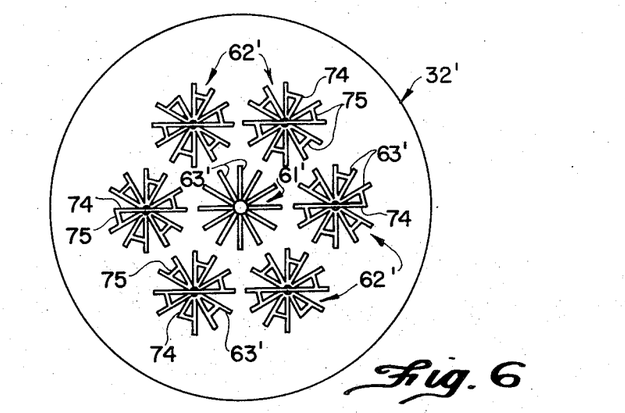
Figure 7:
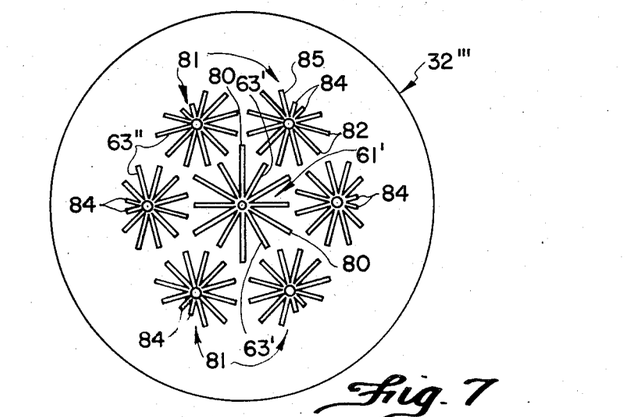

FIG. 7 shows an embodiment which may be characterized as a general improvement of the mask of FIG. 4. In FIGS. 6 and 5 successively, increased peripheral masking is ulitized to achieve image uniformity where the non-uniformity which may have been seen with the masks of FIG. 7 can be assumed to be due to non-linearity.

DESCRIPTION OF THE PREFERRED EMBODIMENT

Figure 1:
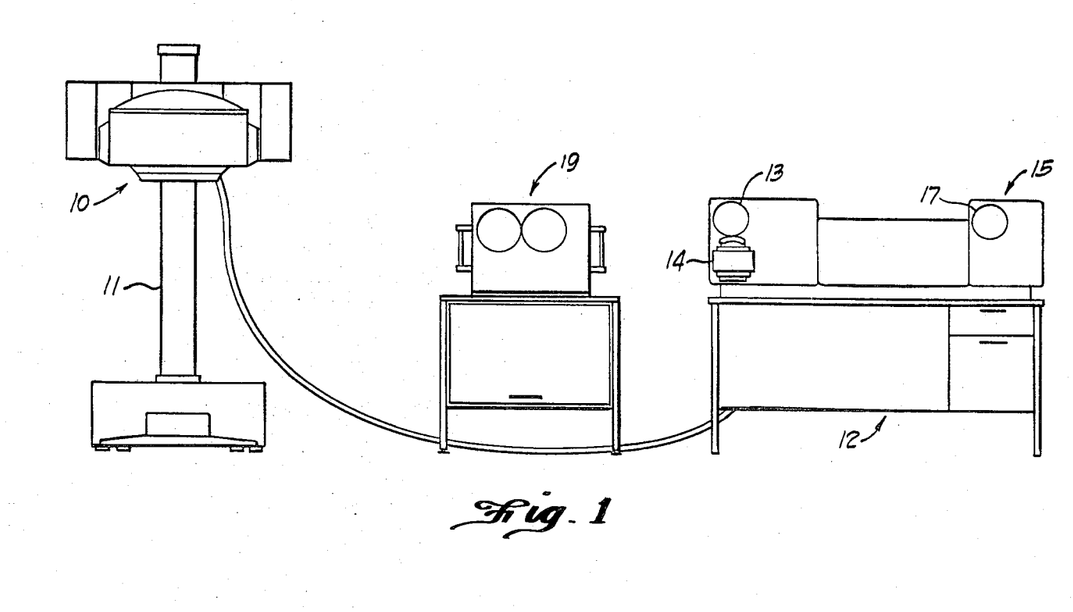
FIG. 1 is a plan view of a camera and associated consoles utilizing the novel detecting head and light conductor of this invention.

Referring now to FIG. 1, a detector head is shown generally at 10. The head is adjustably mounted on a stand 11 for positioning adjacent a patient or other subject. Electrical signals from the head 10 are conducted to circuitry contained within a console shown generally at 12.

The signals, after processing by the circuitry, produce an image, on a monitor oscilloscope 13, of the distribution of an isotope in the subject under investigation. A duplicate image is produced on a camera oscilloscope, not shown, which is viewed and photographed by a camera 14.

The circuitry in the console 12 first produces analog signals in manners more completely described in the referenced applications. Assuming the analog signals represent photopeak events, they are digitized. The digital signals may be fed to a computer for analysis and diagnosis.

The digital information is also fed to a built-in digital data processor 15. This processor utilizes the digital information to generate either a variable width profile histogram of counts versus horizontal distance or a histogram of counts versuS time. Such histograms are displayed on a monitor 17.

The digital information is also fed to a tape recording console shown generally at 19 for storage and subsequent utilization. The digital information is reconverted to analog to produce the images displayed on the monitor oscilloscope 13 and recorded by the camera 14.

Figure 2:
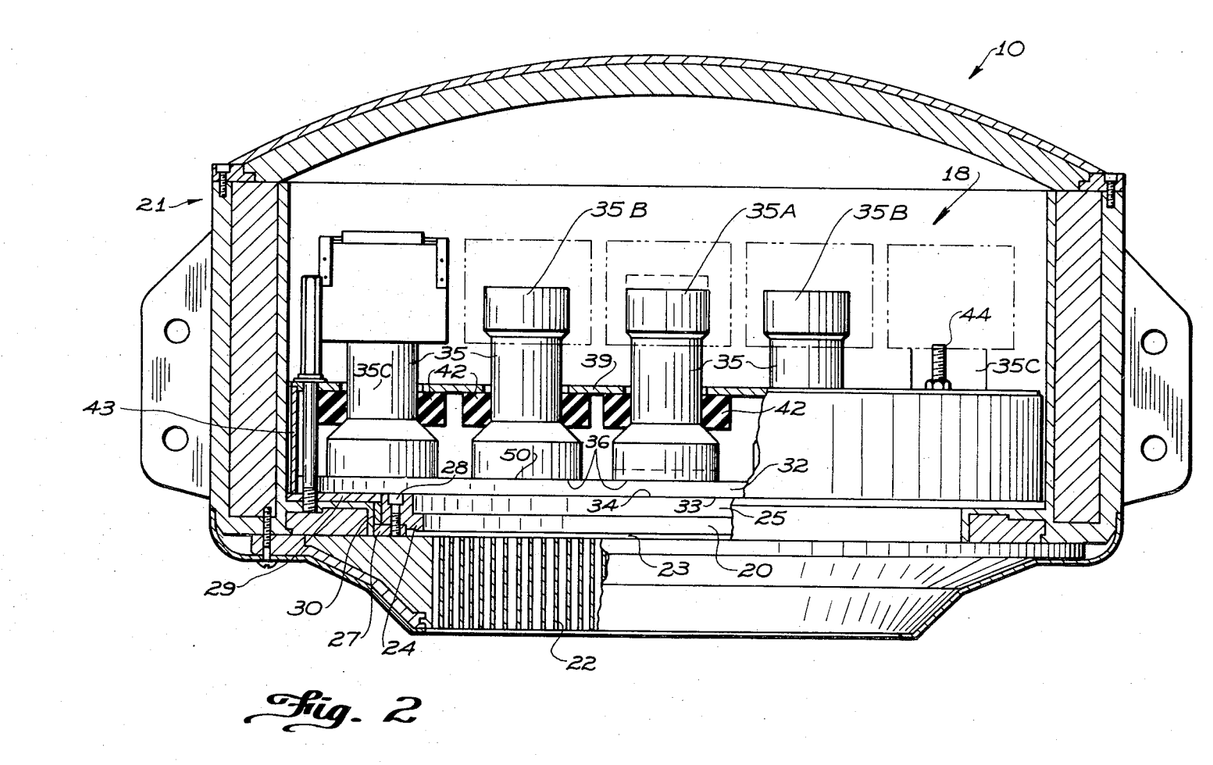
FIG. 2 is a fragmentary sectional view of the detector head of this invention.

The construction of the detector head 10, including an imaging subassembly 18, is shown in FIG. 2. The subassembly is mounted in a housing 21. The subassembly includes a large scintillation crystal 20 of thallium-activated sodium iodide. A collimator 22 shown in the form of a parallel hole type, is removably secured to the housing 21. The housing and the perimetral portions of the collimator are formed of radioactivity shielding material such as lead so that essentially the only radiation which reaches the crystal has travelled along a determinable path through the collimator.

A gamma ray input window 23 is provided. The window 23 is opaque to light but substantially transparent to gamma radiation in the energy range generally used. This input window is typically an aluminum disc fixed to and hermetically sealed to a surrounding crystal supporting ring 24. A glass output window 25 is carried by the crystal supporting ring 24. The crystal 20 and the input and output windows 23, 25 and its supporting ring 24 constitute a component which is commercially available from The Harshaw Chemical Company of Cleveland, Ohio. This component is secured to a supporting ring 27 by suitable fasteners 28. The supporting ring 27 is connected to a crystal assembly support ring 29 by an annular spacer 30.

A light conductor 32 is provided. This light conductor 32 is a disc of transparent material suitable for conducting the light emitted by the crystal such as ultraviolet transmitting Plexiglas. The light conductor 32 has a planar input face 33 that is optically coupled to a polished, planar output face 34 of the output window 25.

A plurality of phototubes 35 are provided. The phototubes 35 are arranged in an array with a total of 19 such tubes being provided. The array comprises a central tube 35A, an inner ring of six tubes 35B around the central tube, and an outer ring of 12 tubes 35C. The phototubes 35 have input light windows 36 which are juxtaposed against the light conductor 32 in a manner which will be described in greater detail presently. Suitable electrical conductors, not shown, couple the phototubes 35 to the circuitry in the console 12.

An apertured tube locator and cover plate 39 is provided. Annular bushings 42 surround a corresponding one of the phototubes. The bushings 42 are interposed between the cover plate 39 and the phototubes 35. The bushings are compressible and, on clamping of the assembly together in a manner which will be described presently, bias each of the tubes 35 into surface engagement with an appropriate portion of the light conductor 32.

A spacer cylinder 43 and a plurality of studs 44 are provided. The studs 44 project through the cover plate 39 and are secured to the crystal assembly support ring 29. The cover plate 39 and the crystal assembly support ring 29 are clamped against the spacer cylinder 43 by tightening down suitable nuts 46 on the studs 44. This fixes the entire lift-out phototube assembly together with the phototubes 35 in closely juxtaposed relationship and good optical coupling with the light conductor 32 and the light conductor in turn optically coupled to the glass window 25.

Figure 3:
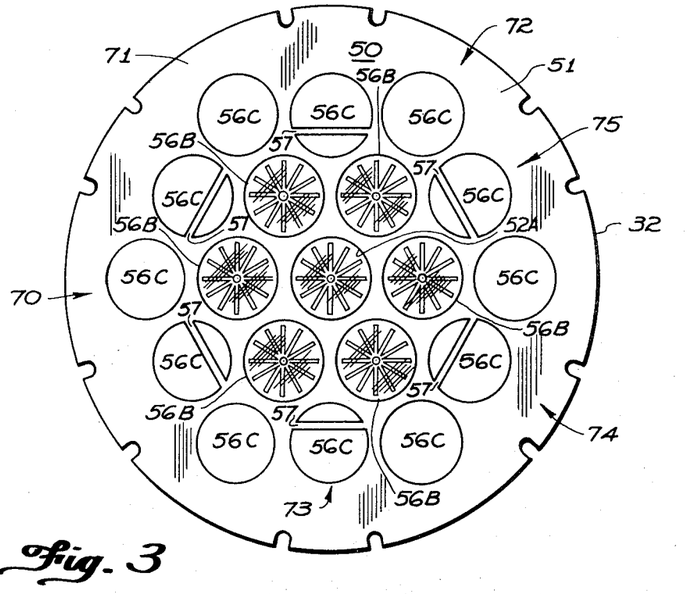
FIG. 3 is a plan view of the light conductor of the MARTONE-GOLDMAN disclosure as seen from the phototube side of the light conductor.

FIG. 3 is a plan view of the phototube side of the light conductor 32 of the MARTONE-GOLDMAN application. The phototube faces of the light conductor of this invention are also coated in the manner shown in FIG. 3. As has been indicated, the light conductor 32 is formed of a material essentially transparent to the light emitted by the scintillator. Phototube face 50 of the light conductor 32 is painted with a reflective coating 51 over its entire surface except where the output face 50 will be optically coupled to the phototube array. Thus, there is a central opening 52A to which the central phototube is optically coupled. Six openings 56B of an inner ring are respectively optically coupled to the inner ring of phototubes, and twelve openings 56C of an outer ring are respectively coupled to the 12 phototubes in the outer ring. Thus, the entire phototube face of the light pipe, except for 19 openings, each approximately the size of the input cathode of a coupled phototube, is covered by a light reflective coating which contributes to the reflection and diffusion of light throughout the light pipe.

As an examination of FIG. 3 will show, six of the phototubes in the outer ring are closer to the central phototube than the remaining six phototubes. In order to increase the useful field size of the system, certain phototubes in the outer ring have partial shields in the form of strips 57 extending across the openings 56C. This is typically shown in FIG. 3 for the six more-closely spaced openings. These masks may be formed in many ways as by the use of masking tape, paper, or the like; but are preferably painted strips of the same material used for the rest of the coating 51. The mask strips 57 may be applied at the same time as the coating 51 so that the strips are part of the coating.

Referring now to FIG. 4, the crystal side of the light conductor 32 has a perimetral ring 60 formed with a reflective coating preferably of the same material as used on the coating 51. The inside diameter of the ring 60 corresponds to the diameter of the window 25. Thus, the crystal side of the light conductor in the area surrounding the window is coated with a reflective material to assist in the light diffusion while the unmasked area within the ring 60 is directly optically coupled to the window 25.

Masks for the central phototube 35A and the inner ring of phototubes 35B are shown in FIG. 4 in the form disclosed in the MARTONE-GOLDMAN application. The mask for the central phototube is designated by the numeral 71 while the masks for the phototubes in the inner ring are designated by the numeral 62. Each of these masks is a spoke-like arrangement having a series of spokes 63 connected together by an annular hub portion 64. Each mask, in its preferred and disclosed form, has an aperture 65 at the center. The masks 61 and 62 are each axially aligned with the related phototube with a central hole that is in axial alignment with the phototube and surrounding spokes and hub 63, 64 that diffuse and reflect the light. These masks preferably are also formed of the same coating material used in the coating 51 but can, like the masks 57, be formed in other ways.

An examination of FIG. 3 will make it apparent that the spokes are each located according to the geometry of the phototube array. Each spoke is disposed symmetrically about a plane located by the axis of the masked tube and the axes of other phototubes. Thus, the central tube over the aperture 52A is the central one of three rows, 70, 71, 72 of five apertures each.

Referring now to FIGS. 5–7, the masks of this invention are shown. Each enables improved resolution over the mask of the MARTONE-GOLDMAN application. By selecting an appropriate one of the three masks, linearity and uniformity in Z decoding are also improved.

The light conductor 32' of FIG. 6 has a central mask 61' similar to the mask 61 of FIGS. 3 and 4. The differences are that the hub opening is somewhat larger and the spokes 63' are somewhat longer. Thus the spokes 63' of FIG. 6 are of a length such that their ends generate a circle of a diameter substantially equal to the diameter of the opening 52A. Thus, the spokes 63' extend fully across the window of the central phototube and to the edges of the aperture 52A defined by the masking material 50.

The masks 62' of the inner ring in FIG. 6 similarly have spokes 63' which extend the width of their aligned phototubes. The outwardly extending spokes 74 which lie along the radii of the central mask 61' are foreshortened as compared with the spokes 63'. In addition, alternate pairs of the spokes 63' are connected by legs 75. One of the spokes 63' is connected to one of the spokes 74 by a leg 75 to form a mask portion generally in the shape of a FIG. 4. The other spokes 63' connected by legs 75 form mask portions that are generally A-shaped in configuration.

Where tests on an assembled detector head with a light conductor 32' indicate linearity characteristics which are poorer than desired, the light conductor 32" of FIG. 5 is substituted for the conductor 32'. The light conductor 32" of FIG. 5 is the same as that of FIG. 6 with the exception that additional legs 75 are added so that the masks of the inner ring take on the configuration resembling a ship's steering wheel with a missing handle in the case of the foreshortened spoke 74. The legs 75 of the masks 62" of FIG. 5 generate a generally circular ring symmetrical about the axis of the mask.

Where tests show a detector head wherein poor uniformity is primarily attributed to non-uniform Z decoding, a mask of the type shown in FIG. 7 is used. Here, the area of the central mask 61" is increased by extending spokes 80 outwardly of the window of the central phototube. These spokes 80 respectively point towards certain tubes in the other ring.

Masks 81 of the inner ring of masks as shown in FIG. 7 are somewhat similar to the masks of FIG. 3. Here, spokes 63" other than a pair of foreshortened spokes 84 and their adjacent spokes 85 are of a length corresponding to the diameter of the openings 56B and the input windows of the inner ring of phototubes. The spokes 85 are essentially equal in length to the spokes 62 of the mask of FIG. 4, while spokes 84 are considerably foreshortened. In addition, the masks 81 are rotated with respect to the orientation of the masks 62. Thus, for example, pairs of foreshortened spokes 84 of each mask 81 are symmetrical about certain radii of the central mask 61".

With experience, tests of a detector equipped with the light conductor of FIG. 6 are not a prerequisite to selection of the proper light conductor. Rather, an experienced person can usually select the appropriate mask based on the results of quantum efficiency tests of the phototubes, and visual and opto-electronic tests of the crystals.

It will be seen from an examination of FIGS. 5–7 that the addition of mask portions in selected areas will compensate for linearity and Z decoding abberations to improve the linearity and overall image uniformity. For distortions in uniformity which at least in part are a function of non-linearity in the vicinity of the inner phototubes, the total area of the masks 62" in the inner ring are increased with respect to the masks 62' of FIG. 6. Thus, areas which are unmasked in FIG. 6 are masked in FIG. 7.

On the other hand, where uniformity in decoding is sought to be improved, other areas of the light detector 32' are masked in FIG. 7, which are not masked in FIGS. 5 and 6. To mask these areas the spokes 80 are extended. In addition, the masking of the inner ring is reduced as compared with the masks of FIGS. 5 and 6.

Accordingly, in any scintillation camera of the phototube type, linearity and uniformity in Z decoding can be improved by selective masking even in cameras which are made in accordance with the art prior to the MARTONE-GOLDMAN application. In addition, resolution improvement is enabled over that taught by Martone-Goldman.

Although the invention has been described in its preferred form with a certain degree of particularity, it is understood that the present disclosure of the preferred form has been made by way of example only and that numerous changes in the details of construction and the combination and arrangement of parts may be resorted to without departing from the spirit and the scope of the invention as hereinafter claimed. For example, the masking material could be an integral part of the light transmitter by way of opaquing of the generally plastic material.

What is claimed is:

1. In a device for producing a display representative of the spatial distribution of incident radiation stimuli from the subject under investigation, the combination of:
   a. a light-emitting mechanism for emitting flashes of light in response to incident stimuli;
   b. light amplification and integrating means for producing dots of light of a brightened intensity at locations corresponding to the locations of flashes in said mechanism and for integrating the dots to produce an image of spatial distribution of radioactivity in a subject under investigation;
   c. a light-conducting material interposed between the mechanism and the light amplification means;
   d. said material having an input surface oriented toward a light responsive portion of said light-amplification means;
   e. a plurality of masks interposed between said mechanism and said light responsive portion of the light amplification means; and,
   f. said masks being arranged in an array with each mask in one portion of an array of an area different than each mask of another portion of the array and still different than yet another portion of the array.

2. The device of claim 1 wherein the array includes a central mask and a ring of masks around the central mask and wherein the area of the central mask is greater than the area of each mask in the ring.

3. The device of claim 1 wherein the array includes a central mask and a ring of masks around the central mask and wherein the area of the central mask is lesser than the area of each mask in the ring.

4. In a device for producing a display representative of the spatial distribution of incident stimuli from the subject under investigation including a light-emitting mechanism for emitting flashes of light in response to such incident stimuli and a plurality of light-responsive components each of which emits electrical signals in response to light signals incident upon it, such signals being porportional to the intensity of the light signal responded to, an improved light conductor forming at least a portion of an optical coupling between the mechanism and the components comprising:
   a. a sheet of light-conducting material having input and output surfaces;
   b. the input surface of the sheet being oriented toward the mechanism;
   c. the output surface of the sheet being oriented toward said light-responsive components;
   d. a plurality of masks interposed between said mechanism and said components and preventing the direct transmission of a portion of the light from a point where a flash of light occurs in said mechanism to a light-responsive component, when said flash occurs in an area masked by said masks; and, e. the area of a central one of the masks being different than the area of an inner ring of masks perimetral of it.

5. The device of claim 4 wherein each of the masks is aligned with one of said components.

6. The device of claim 5 wherein the area of the central mask is greater than the area of each perimetral mask.

7. The device of claim 5 wherein the area of the central mask is lesser than the area of each perimetral mask.

8. In a gamma imagining device, the improved detector comprising:
   a. a housing;
   b. a collimator connected to the housing;
   c. a scintillation crystal carried by the housing inwardly of the collimator;
   d. a plurality of phototubes within the housing and adapted to emit electrical signals in response to light which results from scintillations occurring in the crystal;
   e. a crystal housing around the crystal and including an input window between the crystal and the phototubes, said window being essentially transparent to scintillations;
   f. a light conductor optically connecting the window to the phototube and having a planar input surface in tight juxtaposed optical coupling with said window;
   g. said light conductor having output surface portions in juxtaposed relationship with said phototubes with at least some of said phototubes being in a common plane;
   h. a plurality of masks applied to at least one of the surfaces of the light conductor and inhibiting the direct transmission of light in masked areas from the center of a scintillation to the phototubes;
   i. each of the masks being aligned with a phototube; and,
   j. the mask aligned with the central phototube of an array being of an area different than the masks of an inner ring of masks perimetral of the central mask.

9. The device of claim 8 wherein the central mask and the masks of said ring each include a hub-like portion disposed in axial alignment with its associated phototube and a plurality of radially extending spoke portions extending generally radially outwardly from the hub and wherein certain of said masks include further portions spaced from their associated hub portions and extending laterally of the nearest spoke portions.

10. For use in a scintillation camera of the type having an array of phototubes or the like arranged in a geometric array, the improved light conductor comprising:

a. a sheet of light conducting material having generally parallel input and output faces;
   b. a plurality of masks of light reflective material fixed to at least one of said faces;
   c. said masks being arranged in a mask array corresponding at least in part to said geometric array; and,
   d. certain of said masks each having a hub portion and a plurality of radially extending spoke portions extending generally radially outwardly from the hub and leg portions extending laterally from certain of the spoke portions.

11. The light conductor of claim 10 wherein each leg portion extends continuously between an adjacent pair of spoke portions.

12. The light conductor of claim 11 wherein the leg portions extend between alternate pairs of spoke portions.

13. The light conductor of claim 11 wherein the leg portions extend between each adjacent pair to form an endless substantially circular ring concentric with the hub of the same mask.

14. A method of producing gamma detectors of substantially consistent performance in a scintillation camera of the type having a light emitting member responsive to incident stimuli, an array of light responsive components for emitting electrical signals in response to light stimulation, and a light conductor optically coupling the member to the components comprising the steps of:
   a. operating an assembled detector to test for distortions from desired detector performance; and,
   b. providing masking in selected areas between said member and said components which areas were unmasked in the operated detector to correct for distortions present in the operated detector.

15. In a device for producing a display representative of the spatial distribution of incident radiation stimuli from the subject under investigation, the combination of:
   a. a light-emitting mechanism for emitting flashes of light in response to incident stimuli;
   b. light amplification and integrating means for producing dots of light of a brightened intensity at locations corresponding to the locations of flashes in said mechanism and for integrating the dots to produce an image of spatial distribution of radioactivity in a subject under investigation;
   c. a light-conducting material interposed between the mechanism and the light amplification means;
   d. said material having an input surface oriented toward a light responsive portion of said light-amplification means;
   e. a plurality of masks interposed between said mechanism and said light responsive portion of the light amplification means;
   f. masking material providing an apertured and otherwise a light impervious shield; and
   g. said masks being aligned with said apertures and including portions extending to edges of said apertures.

16. The device of claim 15 wherein each of said masks includes a hub and a plurality of spoke portions and where certain of the spokes extend beyond the edges of said apertures.

17. The device of claim 15 wherein each of the masks includes a hub and a plurality of the spokes and certain of the spokes terminate inwardly of the edges of said apertures.

18. The device of claim 15 wherein certain of the masks have hub portions and extending spoke portions and wherein certain of the spoke portions are connected by leg portions.

19. The method of claim 14 wherein there is a central component and a ring of components around the central component and wherein said step of providing masking in selected areas includes masking areas in alignment with selected ones of said ring components, which selected areas were unmasked in the operated detector.

20. The method of claim 14 wherein there is a central component and a ring of components around the central component and wherein said step of providing masking in selected areas includes masking areas near the central component, which selected areas were unmasked in the operated detector.

21. The method of claim 14 wherein the operated detector had masking interposed between said member and said components, and said step of providing masking in selected areas includes unmasking other selected areas which were masked in the operated detector.

22. The method of claim 14 wherein the operated detector had a central component and a ring of components around said central component and was provided with masking both near said central component and near said ring of components, and the step of providing masking in selected areas includes adjusting the relative areas of masking near said central component and said ring of components.

23. The method of claim 22 wherein said step of adjusting the relative areas of masking includes decreasing the masking in one of said areas and increasing the masking in the other of said areas.

24. The method of claim 22 wherein said step of adjusting the relative areas of masking includes increasing the masking in one of said areas.

25. In a device for producing an output signal representative of the spatial distribution of incident radiation stimuli from a subject under investigation, the combination of:
  a. secondary radiation emitting means for emitting secondary radiation in response to incident radiation stimuli;
  b. a plurality of secondary radiation responsive means for receiving secondary radiation and generating an output signal representative of the spatial distribution of said secondary radiation, said radiation responsive means being arranged in an array with at least one centrally disposed radiation responsive means surrounded by at least one ring of other radiation responsive means;
  c. a plurality of masks interposed between selected ones of said secondary radiation emitting means and said secondary radiation responsive means, said masks being opaque, at least in part, to said secondary radiation; and,
  d. such of said masks as are aligned with said centrally disposed radiation responsive means having a different radiation opaque area than such of said masks as are aligned with the adjacent surrounding ring of radiation responsive means.

26. The device of claim 25 wherein said centrally disposed masks have a greater radiation opaque area than do said adjacent ring masks.

27. The device of claim 25 wherein said centrally disposed masks have a lesser radiation opaque area than do said adjacent ring masks.

28. The device of claim 25 wherein:
  a. said centrally disposed masks comprise a single mask; and,
  b. said single mask includes radially extending portions which extend in directions toward each of said adjacent ring masks.

29. The device of claim 28 wherein:
  a. said adjacent ring masks each include a plurality of radially extending regions extending outwardly from a central hub; and,
  b. selected ones of said radially extending regions which are aligned with said radially extending portions are of lesser length than are others of said radially extending regions.

30. The device of claim 28 wherein:
  a. said single mask further includes radially extending projections which point in directions other than toward said adjacent ring masks; and,
  b. said radially extending projections are of greater length than are said radially extending portions.

31. A method of producing gamma detectors of substantially consistent performance in a scintillation camera of the type having a light emitting member responsive to incident stimuli, an array of light responsive components for emitting electrical signals in response to light stimulation, and a light conductor optically coupling the member to the components comprising the steps of:
  a. operating an assembled detector to test for distortions from desired detector performance; and,
  b. unmasking in selected areas between said member and said components which areas were masked in the operated detector to correct for distortions present in the operated detector.

* * * * *

UNITED STATES PATENT OFFICE
CERTIFICATE OF CORRECTION

Patent No. 3,814,938             Dated June 4, 1974

Inventor(s) Ronald J. Martone et al

It is certified that error appears in the above-identified patent and that said Letters Patent are hereby corrected as shown below:

Col. 6, line 39, "versuS" should be - - versus - -

Col. 8, line 23, "71" should be - - 61 - -

Col. 9, line 20, "other" should be - - outer - -

Claim 8, line 1, "imagining" should be - - imaging - -

Signed and sealed this 15th day of October 1974.

(SEAL)
Attest:

McCOY M. GIBSON JR.                C. MARSHALL DANN
Attesting Officer                  Commissioner of Patents